(12) United States Patent
Witzel et al.

(10) Patent No.: US 8,179,796 B2
(45) Date of Patent: May 15, 2012

(54) METHOD AND NODE FOR PROVIDING A RESOURCE EFFICIENT CONNECTION IN A COMMUNICATION NETWORK

(75) Inventors: Andreas Witzel, Herzogenrath (DE); Dirk Kampmann, Vaals (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 88 days.

(21) Appl. No.: 12/445,816

(22) PCT Filed: Oct. 19, 2006

(86) PCT No.: PCT/EP2006/010113
§ 371 (c)(1),
(2), (4) Date: Apr. 16, 2009

(87) PCT Pub. No.: WO2008/046440
PCT Pub. Date: Apr. 24, 2008

(65) Prior Publication Data
US 2010/0208585 A1    Aug. 19, 2010

(51) Int. Cl.
*H04W 72/00* (2009.01)
*H04J 3/14* (2006.01)
(52) U.S. Cl. ..................... 370/231; 455/452.2
(58) Field of Classification Search ............ 370/216, 370/229, 230, 231, 360, 343, 338, 465; 455/452.2, 455/563
See application file for complete search history.

(56) References Cited

U.S. PATENT DOCUMENTS

| | | | |
|---|---|---|---|
| 2003/0195981 A1* | 10/2003 | Graf et al. | 709/238 |
| 2004/0002339 A1* | 1/2004 | O'Connor | 455/450 |
| 2006/0094472 A1* | 5/2006 | Othmer et al. | 455/563 |
| 2007/0043558 A1* | 2/2007 | Schwarz et al. | 704/207 |
| 2008/0219225 A1* | 9/2008 | Krishnamurthy et al. | 370/338 |
| 2010/0157791 A1* | 6/2010 | Casaccia et al. | 370/216 |

FOREIGN PATENT DOCUMENTS

| | | |
|---|---|---|
| EP | 1 198 146 A | 4/2002 |
| WO | WO 2005/096585 A | 10/2005 |

* cited by examiner

*Primary Examiner* — Kwang B Yao
*Assistant Examiner* — Awet Haile (57) ABSTRACT

A method, a network node and a program unit for controlling the establishment or modification of a connection in a communication network are disclosed. The connection is to be established or modified between nodes that are adapted to employ a coding scheme selected from a plurality of supported coding schemes having a different demand on a utilization of a network resource. In accordance with the invention an expected demand on a utilization of a network resource associated with employing the at least one of the supported coding schemes is determined, and a node controlling the connection selects the coding scheme to be employed such that the associated expected demand on the network resource utilization is minimized.

3 Claims, 7 Drawing Sheets

Fig. 7

METHOD AND NODE FOR PROVIDING A RESOURCE EFFICIENT CONNECTION IN A COMMUNICATION NETWORK

FIELD OF INVENTION

The invention relates to method and a node for providing on a call by call basis a resource efficient connection and in particular a resource efficient selection of payload coding schemes along a wireless or wireline connection.

BACKGROUND

Communication networks consist of interconnected nodes and can be subdivided into core networks and access networks, the latter providing access to user equipment, for example a wireless access for mobile user equipment to a radio access network. Core networks interconnect access networks and further networks, e. g. other core networks or the Internet. In the Universal Mobile Telecommunications System (UMTS) architecture, an access network can be controlled by a Radio Network Controller (RNC), which is connected to the core network and provides access to the core network, i.e. serves as access node. In the Global System for Mobile Communications (GSM) architecture, the access network can be controlled by a Base Station Controller (BSC). The 3G core network is controlled by one or more Mobile Switching Centres (MSCs). These MSCs also influence the decisions in RNC and BSC.

For the transmission on a connection, speech (or other media) is encoded (and subsequently decoded) according to one or more encoding/decoding schemes, also referred to herein as coding schemes and alternatively denoted "codecs". Determination of an optimal codec or set of codecs may be done by means of Codec Negotiation. A coding scheme can transport speech either in a compressed or in a non-compressed mode. In many networks, different coding schemes can be used and different nodes can have different capabilities for handling the coding schemes. Speech transcoders perform the transcoding between different speech coding schemes, i.e. they decode the one scheme into speech (linear PCM or other representation) and then encode the speech by the other scheme. However a transcoder may also transcode speech directly between coding schemes without involving an intermediate representation of the speech. Hence, a transcoder is a device that performs a codec, i.e. it implements a particular coding scheme (in fact a transcoder can implement a number of coding schemes and employ them on per call basis as requested by call/session control applications). Tandem Free Operation (TFO) is a configuration of two transcoders with compatible coding schemes on the compressed voice sides at both ends of a connection, i.e. on the interface to the user equipment. In this case, the transcoding stages can be bypassed and the compressed voice coding is used end to end in the connection (see 3GPP TS 28.062).

Out of Band Transcoder Control (OoBTC) permits speech connections to be established end to end with a common coding scheme, i.e. ideally the same speech coding is used in the whole connection between the access networks. The advantage is that maintaining compressed voice saves core network bandwidth and optimizes speech quality, because transcoding stages, which in principle always introduce distortion, are avoided (see 3GPP TS 23.153).

An International Telecommunication Union (ITU) protocol called Bearer Independent Call Control (BICC) supports out of band signaling procedures, which allow a negotiation of the coding scheme between network nodes. In the ITU-Telecommunication Standardisation Sector (ITU-T) proposal BICC Q. 1901 (ITU, June 2000), coding scheme negotiation is performed from the originating control node in a connection to each subsequent node by including a list of allowed coding schemes in the Application Transport Parameter (APP) parameter in the Initial Address Message (IAM) for the set-up of the connection. Each node checks the list and if it does not support a particular coding type it removes it from the list. The adapted list is passed on with the IAM and any non-supported types are removed as long as the BICC signaling is supported. When the final node, either the terminating node or the last node supporting BICC, is reached, the coding scheme type is selected by the node. This selected coding scheme and the list of remaining, commonly supported codec schemes are returned to the originating node via all intermediate nodes.

In the BICC coding scheme negotiation procedures there are no rules for defining how many transcoder stages are allowed and whether an access network that supports out of band coding scheme negotiation can activate transcoders to keep Transcoder Free Operation (TrFO) between the access node and the rest of the network. The number of transcoding stages in a connection end to end can significantly affect the speech quality. More than three transcoding stages typically cause substantial speech impairment. The number of stages causing a substantial impairment depends on the coding algorithm/scheme and the speech impairment by further entities in the connection.

The coding scheme negotiation procedures may result in transcoders being activated to enable supplementary services or because the bearer technology in a node or network does not support compressed voice. For example, Asynchronous Transfer Mode (ATM) networks allow transmission of either compressed or non-compressed speech, while Synchronous Transfer Mode (STM) networks require non-compressed speech coding, which via bit stealing can include TFO with compressed speech (TFO is not really required in STM). Furthermore, it would be desirable that the negotiation should result in the controlled selection of the transcoders, which is with today's technologies not always the case.

In many cases, it is necessary to modify the coding scheme in a section of a connection. For example, a connection is often transferred between different access networks due to a handover. Also in this case a controlled selection of transcoders is often not achieved.

Therefore it is an object of the invention to provide an improved method for controlling the selection of a coding scheme to be employed in a communication network.

SUMMARY OF THE INVENTION

Therefore in accordance with the teachings of the present invention a method for controlling the establishment or modification of a connection in a communication network is provided. In the provided method the connection is to be established or modified between nodes that are adapted to employ a coding scheme selected from a plurality of supported coding schemes having a different demand on a utilization of a network resource, i.e. a network resource dedicated to the connection to be established or modified. The provided method is remarkable in that an expected demand on a utilization of a network resource is determined, which expected demand is associated with employing the at least one of the supported coding schemes, and the provided method is further remarkable in that a node controlling the connection selects the coding scheme to be employed such that the associated expected demand on the network resource utilization is minimized.

According to a particular aspect of the provided method an indicator is received in the network node controlling the connection. The indicator indicates that the expected utilization of the network resource should be minimized for the connection to be established or modified. The connection control node checks the indicator and determines to minimize the network resource utilization.

By this a resource efficient utilization of network resources can be controlled easily.

According to a further aspect of the provided method the network resource utilization is a transmission bandwidth dedicated to the connection to be established or modified, e.g. the transmission bandwidth required for a transmission over the connection to be established or the established connection according to the coding scheme to be employed.

By this scarce and sensitive transmission resources can be utilized optimally.

According to another aspect of the provided method, the network resource utilization is a processing power consumption required for a potential transcoding between the at least one of the supported coding schemes and a further coding scheme. E.g. when the connection comprises a plurality of connection stages and the coding scheme to be employed may be a first coding scheme for a first connection stage, and a second coding scheme may be employed for a second coding stage. In this context the network resource could be a transcoding device and the demand on the network resource utilization would be an expected processing power consumption required for a transcoding between the first and the second coding scheme.

A further aspect of the provided method concerns the supported coding schemes potentially affecting a connection quality. According to this aspect an allowed impairment value threshold is determined indicating a maximum allowed impairment of the connection to be established or modified and an expected accumulated impairment value indicating an expected accumulated impairment associated with employing a corresponding coding scheme for the connection to be established or modified. is determined for at least one of the supported coding schemes. The node controlling the connection selects the coding scheme to be employed within one or more coding schemes having an associated accumulated impairment value conforming with the allowed impairment value threshold, i.e. an associated accumulated impairment value equal or below the allowed impairment value threshold.

By this efficient network resource utilization can be achieved while maintaining an acceptable connection quality.

According to yet a further aspect of the provided method the connection comprises a plurality of connection stages and a plurality of candidate paths with respect to concatenations of coding schemes leads from one or more preceding stages through a current stage to succeeding stages. Regarding a particular one of the plurality of candidate paths the node controlling the connection receives a first impairment value indication indicating an expected impairment associated with employing any coding schemes of the one or more preceding stages of the particular candidate paths. The node controlling the connection receives a further impairment value indication indicating an expected impairment associated with employing any coding scheme of the succeeding stages of the particular candidate path and the node controlling the connection uses the first and the further impairment value indication when it determines the accumulated impairment of the candidate path associated with employing a coding scheme at its current stage.

By this impairment value calculation can be kept manageable.

According to yet a further aspect of the provided method a subscriber is associated with the connection to be established or modified and the allowed impairment value threshold is determined according to a subscription of said subscriber.

By this new business models for subscriptions can be provided.

Furthermore in accordance with the teachings of the present invention a network node for controlling the establishment or modification of a connection in a communication network is provided. The connection is to be established or modified between nodes that are adapted to employ a coding scheme selected from a plurality of supported coding schemes that have a different demand on a utilization of a network resource. The network node is remarkable in that it comprises a network resource demand determining unit for determining an expected demand on a utilization of a network resource associated with employing the at least one of the supported coding schemes, and a coding scheme selection unit for selecting the coding scheme to be employed such that the associated expected demand on the network resource utilization is minimized.

The provided network node is susceptible to embodying any of the above disclosed aspects of the method provided in accordance with the teachings of the present invention.

According to yet another aspect of the teachings of the present invention a program unit on a data carrier loadable into a network node is provided. When run on the network node, the program unit instructs the network node to perform the following steps: controlling the establishment or modification of a connection in a communication network, wherein the connection is to be established or modified between nodes that are adapted to employ a coding scheme selected from a plurality of supported coding schemes having a different demand on a utilization of a network resource, determining an expected demand on the utilization of a network resource associated with employing the at least one of the supported coding schemes, and selecting the selecting the coding scheme to be employed such that the associated expected demand on the network resource utilization is minimized.

The provided program unit is susceptible to embodying any of the above disclosed aspects of the method provided in accordance with the teachings of the present invention.

DETAILED DESCRIPTION OF EMBODIMENTS

In the following the invention is described in more detail by means of embodiments and figures. Equal reference signs indicate equal elements.

In the following description, for the purposes of explanation and not limitation, specific details are set forth to provide a thorough understanding of the invention. It will be apparent to those skilled in the art that the invention may be practiced in other embodiments that depart from these specific details. In particular, the functions explained herein below may be implemented using individual hardware circuitry, using a software functioning in conjunction with a programmed microprocessor or general purpose computer, using an application specific integrated circuit (ASIC) and/or using one or more digital signal processors (DSPs).

Figure 1:
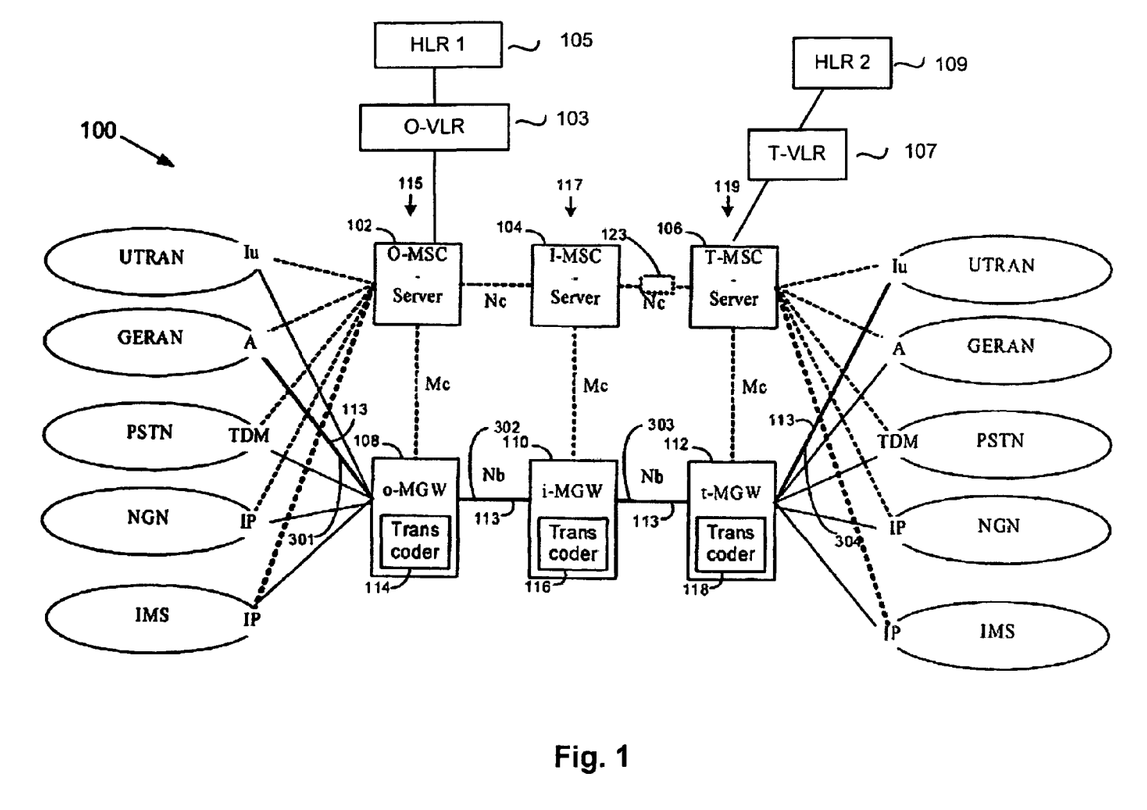
FIG. 1 is a block diagram depicting a network architecture of a network that can be applied in accordance with the teachings of the present invention.

Turning now to FIGS. 1-7, exemplary embodiments of the invention will now be described. First, with reference to FIG. 1, a communication system 100 is illustrated, in which the invention is implemented. Communication system 100 may be a combination wireless/wireline system. Communication system 100 includes a set of nodes 102-112 through which signals are routed that pertain to a communication connection, such as an individual speech telephone conversation conducted between mobile telephones. The individual nodes represent individual pieces of telecommunication equipment, such as servers, computer processors, and the like, or systems composed of such components. In the example of FIG. 1, the nodes include a set of MSC servers or control nodes 102, 104, 106 through which control signals are routed and a set of MGWs (Media Gateways) or payload nodes 108, 110, 112, through which the actual payload data corresponding to a connection 113 is routed, such as a speech connection. Furthermore the nodes include a VLR (Visitor Location Register) 103 associated with the MSC Server 102 and a VLR (Visitor Location Register) 107 associated with the MSC Server 106. The VLR 103 is connectable with the HLR (Home Location Register) 105 and the VLR 107 is connectable with the HLR (Home Location Register) 109.

The exemplary connection includes four portions 301, 302, 303, and 304. The nodes are shown as being arranged in stages. In particular, an originating stage 115, an intermediate stage 117, and a terminating stage 119 are illustrated. The nodes 102, 103, 105, 108 of the originating stage 115 are associated with the user equipment (not specifically shown) that originates the connection. HLR 105 is the HLR of the home network of the subscriber that uses the user equipment that originates the connection (herein termed the originating subscriber). In that context the VLR 103 stores subscription information associated with the originating subscriber, which subscription information has been previously downloaded from the HLR 105, e.g. via an Insert Subscriber Data MAP operation. According to the present invention said subscription information for the originating subscriber includes a subscribed quality level indicating a target quality level for the originating subscriber.

In the example shown, each stage includes one control node and one payload node. It should be understood, however, that some stages may include multiple control or payload nodes and some control nodes may control payload nodes of multiple stages. Hence, the scope of each stage is somewhat arbitrary. The term stage is used herein primarily for ease in distinguishing among originating, intermediate (if any) and terminating portions of the connection. (Note that, in the figure, O-MSC can also play the role of TSC and GMSC nodes, while I-MSC can be a TSC node only, whereas T-MSC can also be TSC.)

Depending upon the originating user equipment, signals exchanged between the originating nodes and the user equipment may be received, for example, via Iu from a UTRAN system, via A from a GERAN system, via TDM from a PSTN system, via IP from a NGN system or via IP from a IMS system. UTRAN stands for UMTS Terrestrial Radio Access Network. Iu is an abbreviation for the UTRAN interface. GERAN stands for GSM/EDGE radio access network, where EDGE refers to "enhanced data rates for GSM evolution." "A" refers to the interface within the GERAN architecture between an MSC/MGW and a base station subsystem (BSS) of the GERAN. PSTN is the public switched telephone network and TDM refers to time-division multiplexing. IMS is the IP Multimedia Subsystem and NGN refers to Next Generation Networks.

The terminating nodes (106, 107, 109, 112) are associated with the terminating user equipment that receives the connection. HLR 109 is the HLR of the home network of the subscriber that uses the user equipment that terminates the connection (herein termed the terminating subscriber). In that context the VLR 107 stores subscription information associated with the terminating subscriber, which subscription information has been previously downloaded from the HLR 109, e.g. via an Insert Subscriber Data MAP operation. According to the present invention said subscription information for the terminating subscriber includes a subscribed quality level indicating a target quality level for the terminating subscriber. In case both the originating and the terminating subscriber belong to the same home network, HLR 105 and HLR 109 will probably be identical and the distinction between HLR 105 and HLR 109 becomes a merely logical.

Likewise, depending upon the terminating user equipment, signals exchanged between the terminating nodes and the terminating equipment may be via Iu from a UTRAN system, via A from a GERAN system, via TDM from a PSTN system or via IMS from a NGN system. The intermediate nodes (104, 110) represent any additional nodes that may be required between the originating node and the terminating nodes.

In order to establish, process, and eventually terminate a connection, various messages are transmitted between the MSC servers. Exemplary messages include establishment messages, modification messages, and acknowledgement messages relating to the acknowledgement of a modification message or an establishment message. An exemplary message 123 is shown within FIG. 1, which is relayed from a MSC server 104 to MSC server 106. To relay speech for a telephone conversation, one or more transcoders (114, 116, 118) are provided within the various MGWs. Although only a single transcoder is illustrated per MGW in FIG. 1, in practice each MGW may support numerous transcoders. Additionally, although not shown, the originating user equipment or the terminating user equipment may also include one or more codecs.

The transcoders compress and decompress speech, as needed, using one or more codecs to enable transmission within the limited bit rate that may be associated with a particular connection, such as exemplary connection 113. Speech is compressed by a transcoder of one stage, then decompressed by a transcoder of another stage, in accordance with a particular codec that both transcoders are capable of employing. Hence, the codecs themselves essentially represent connections between transcoders. (This is illustrated more clearly in FIG. 2, discussed below.) Exemplary codecs include GSM_HR, GSM_EFR, and AMR. Each time a codec is used, the act of coding and then decoding the speech tends to degrade or impair the speech quality. Different codecs impair or degrade speech quality by potentially differing amounts.

Among the information contained within control messages, such as message 123, is information pertaining to the available codecs in a specific node along the connection path. In particular, the message preferably includes a list of "supported codecs," i.e. encoding/decoding schemes capable of being performed between the transcoders of the various MGWs and that may be activated or deactivated during any particular connection. Using information contained within the supported codec list, the MSC servers selectively employs codecs along connection 113. In addition to providing a list of supported codecs, message 123 preferably also includes an information element having individual impairment values, one per supported codec, that indicate the expected accumulated impairment along a candidate connection path 121 associated with the supported codec. Furthermore, as will be described in more detail below, message 123 preferably includes an information element indicating a subscribed target quality level of the originating subscriber. In addition message 123 preferably includes an indicator that indicates that a required bandwidth should be minimized for at least one of the connection stages of the connection and that the bandwidth minimizing requirement has precedence over the subscribed target quality level requirement.

Figure 2:
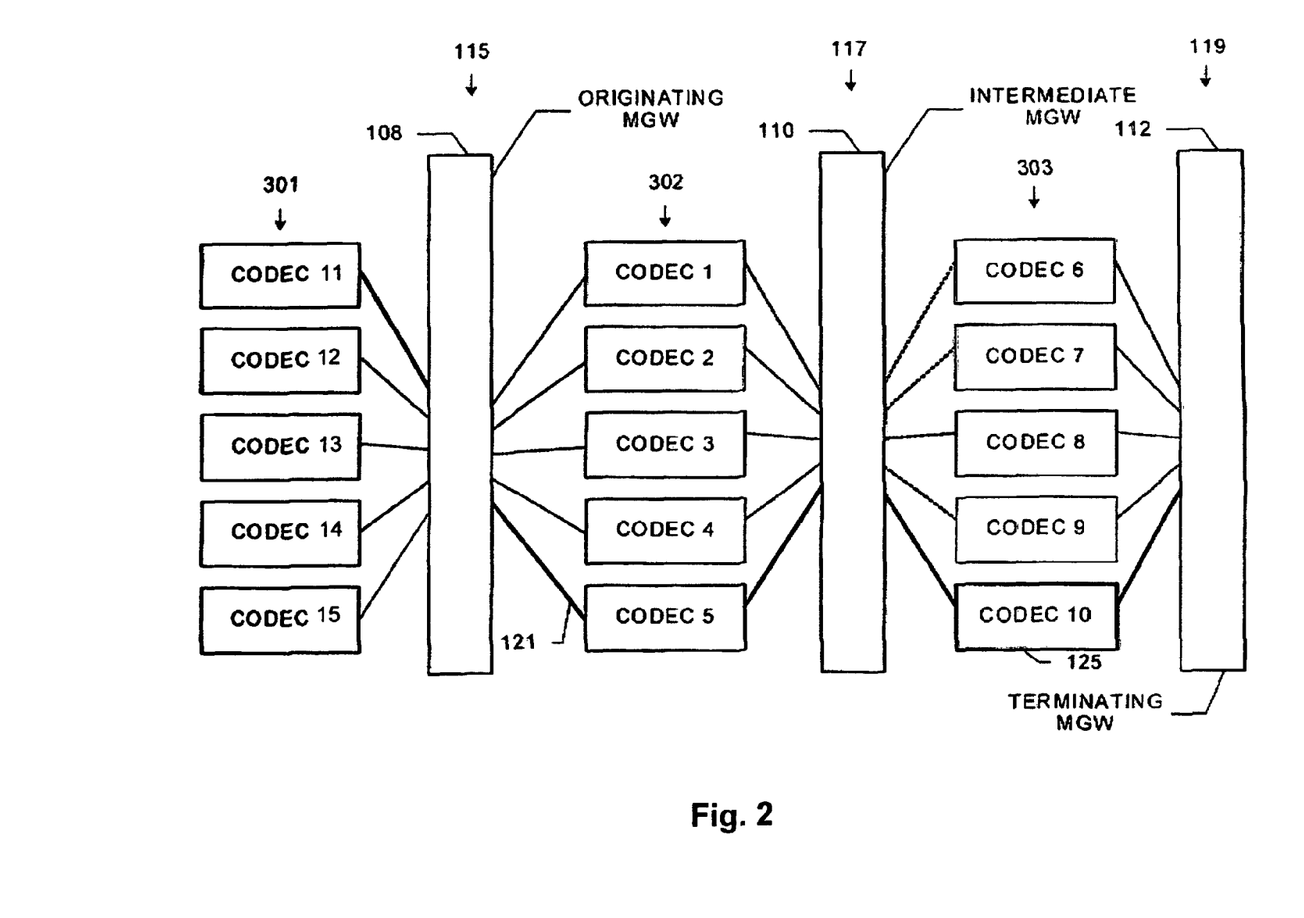
FIG. 2 is a block diagram illustrating candidate pathways associated with the telecommunication system of FIG. 1.

The information element of message 123 will be described in greater detail below. First, however, "candidate connection paths" will be described with reference to FIGS. 2 and 3. FIG. 2 illustrates exemplary codecs that may be used between the MGWs of the three stages of FIG. 1. Each MGW has transcoders (FIG. 3) capable of implementing various codecs, which differ from one another and may also differ from the codecs of the other stages. In the example of FIG. 2, the originating user equipment (not shown) and the originating MGW stage are both capable of supporting Codecs 11-15 and so connection portion 301 is implemented using one of Codecs 11-15. The originating stage and the intermediate stage are both capable of supporting Codecs 1-5 and so connection portion 302 is also implemented using one of Codecs 1-5. The intermediate stage and the terminating stage are both capable of supporting Codecs 6-10 and so connection portion 303 is implemented using one of Codecs 6-10.

A large number of possible connection paths may be defined through the codecs from the originating stage through the terminating stage. These are shown in phantom lines. With multiple intermediate stages, a much greater number of possible paths may be present. The originating user equipment and the terminating user equipment also preferably support multiple codecs, hence the connection path from the originating user equipment to the terminating user equipment may have a still greater number of possible connection paths. Ideally, all MGWs support the same list of alternative codecs and allow the MSCs to select a codec end-to-end, depending on the originating and/or terminating terminals.

For any given codec that is supported by the transcoders of a particular stage, one of the possible paths leading up to that stage is considered preferred or optimal based, for example, on the expected accumulated connection impairment along the path leading up to that stage. This preferred or optimal path is referred to in this context as a "candidate path", since it represents one viable candidate for the final connection path through the entire sequence of stages (i.e. connection 113 of FIG. 1.) So, in this context, not all possible paths are considered "candidate paths." Rather, for each supported codec of each stage, only one candidate path is selected from among all of the possible paths leading to that stage. At each stage, a separate impairment value is maintained within message 123 of FIG. 1 for each supported codec of that stage. The impairment value represents at least the total impairment along the candidate paths leading to that stage. A particular candidate path is defined by its codec combinations applied within the various MGWs. One exemplary candidate path is highlighted in FIG. 2. More specifically, path 121 represents the "candidate path" for codec 125 as supported by the terminating stage 119. An impairment value is stored within message 123 that represents the impairment along path 121. Although not highlighted within the figure, each of the other supported codecs of the terminating stage also has a single candidate path associated therewith. Hence, in this simplified example, there are five candidate paths leading to the terminating stage since the terminating stage supports five different codecs. Separate impairment values are maintained within message 123 for those candidate paths as well. Ultimately, one of these candidate paths leading to the terminating stage is selected as the final connection path. In accordance with the teachings of the present invention the final path is chosen such that the overall impairment calculated for the path based on the various impairment values is within the range of allowed impairment values. This range of allowed impairment values is advantageously associated with the subscription of either the originating or the terminating subscriber. Alternatively, when the indicator indicating that the required bandwidth for the connection should be minimized and that minimizing the required bandwidth has a precedence over the subscribed target quality level requirement is detected, the allowed impairment values advantageously still have a threshold value indicating a maximum allowed impairment for the connection as upper limit. Practically the allowed impairment value threshold will be less strict than the maximum of the subscribed impairment value range. However also said allowed impairment threshold can be determined according to a subscription. Alternatively the impairment threshold could also be defined by an operator operating network 100.

Once the final path is selected, the various codecs along that particular path are then used to process the speech signal.

Figure 3:
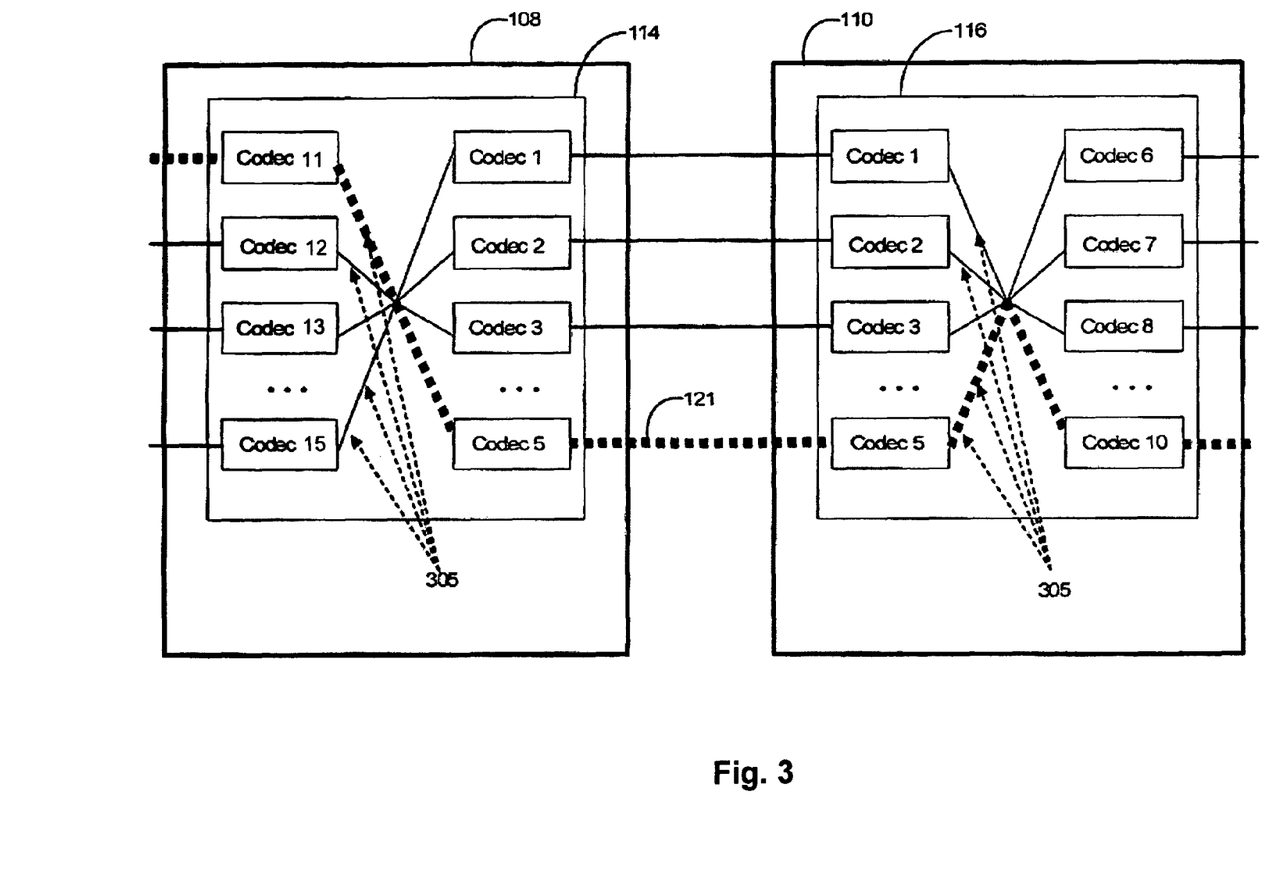
FIG. 3 is a block diagram illustrating candidate pathways of FIG. 2 with respect to internal components of a pair of exemplary media gateways.

FIG. 3 illustrates how payload data is routed through MGWs. Each MGW includes one or more transcoders. With FIG. 3, transcoder 114 of originating MGW 108 is shown and transcoder 116 of intermediate MGW 110 is shown. Transcoder 114 is capable of implementing Codecs 11-15 and 1-5, and hence Codecs 11-15 and 1-5 are illustrated therein. It should be understood, however, that the Codecs do not represent pieces of equipment within the transcoder but represent coding schemes supported by the transcoder. Transcoder 116 is capable of supporting Codecs 1-5 and Codecs 6-10. As can be seen, transmission between MGWs occurs between like codec portions of the transcoders, i.e. transcoder 114 encodes speech via Codec 5 and transcoder 116 then decodes the speech using Codec 5. Internal payload transmission within the MGWs is illustrated via lines 305 and may be implemented, e.g. via linear PCM. For example, speech decoded via the Codec 11 decoder of transcoder 114 could be internally transmitted via PCM to the Codec 5 encoder of transcoder 114 for subsequent transmission to MGW 116. However, internal signal routing need not be between like codecs. One important side aspect of the codec selection procedures is, that each MSC node in the path has only a limited "local" view on its own resources and the incoming list of candidate codecs (paths), but the whole procedures shall find the optimum for a particular codec. Each node in the path, at some point, performs pre-selections to minimize the information flow to the next node, without scarifying that optimum and without knowing the resources of the following stages.

According to the general concept, an intermediate node gets the list of n supported codecs from the preceding node, together with the n associated accumulated impairments for each candidate. This intermediate node knows also all m of its own codecs and the m associated impairments these would introduce, if selected and inserted into the path. The intermediate node can therefore calculate all n*m combinations and all of these n*m total accumulated impairments. Then, in order to keep the outgoing list within a manageable size, it has to select k of these candidates to send these further on to the next node, together with the k associated accumulated impairments. In the example of FIG. 3, k is equal to n, however generally the list of candidates may be now bigger than in the incoming list.

As an example of a definition of a candidate path by codec combinations at the MGWs, the highlighted candidate path is defined by the combination of Codec 11 and Codec 5 at the originating MGW, a combination of Codec 5 and Codec 10 at the intermediate MGW, and a further combination in the terminating MGW, which is not shown. The Codec combinations at a particular MGW for the candidate paths are determined at call set up in the corresponding controlling MSC servers and memorized in the controlling MSC servers, e.g. the originating MSC server 102 memorizes that the highlighted candidate path comprises a combination of Codec 11 and Codec 5 at the originating MGW 108 that it controls.

Figure 4:
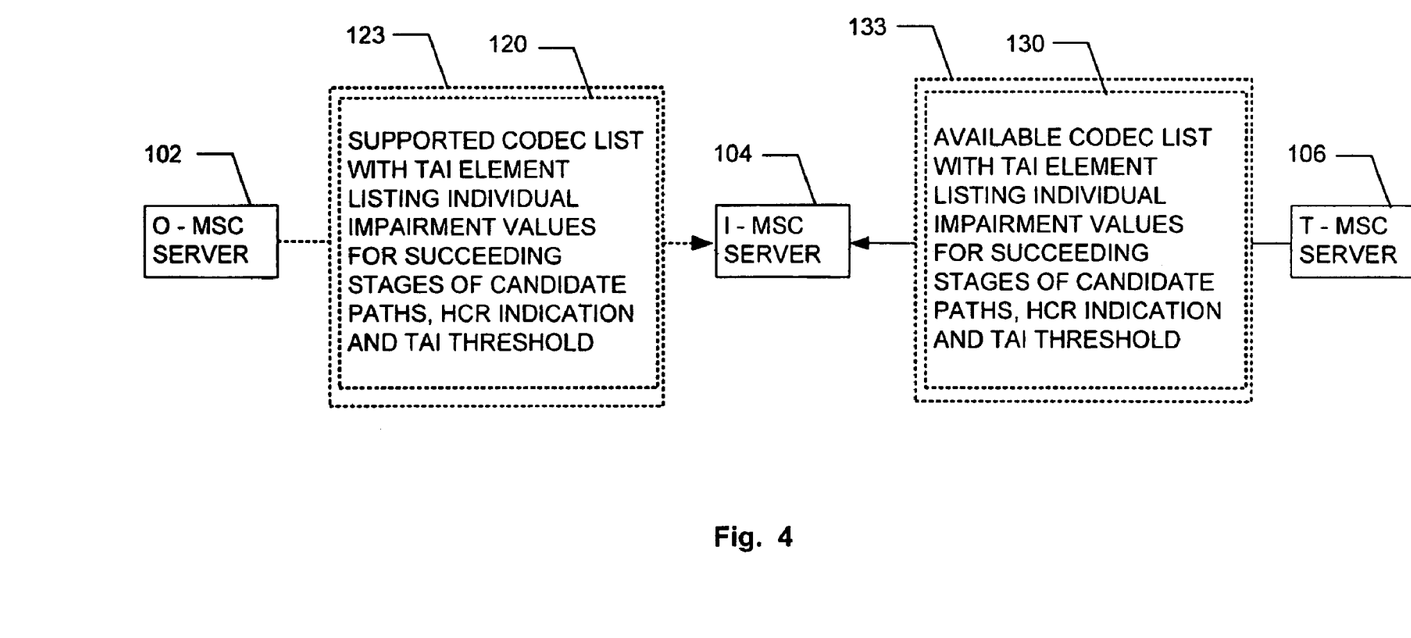
FIG. 4 is block diagram illustrating exemplary media gateways exchanging codec list messages including TAI elements, a high compression route indication and a TAI threshold.
Figure 5:
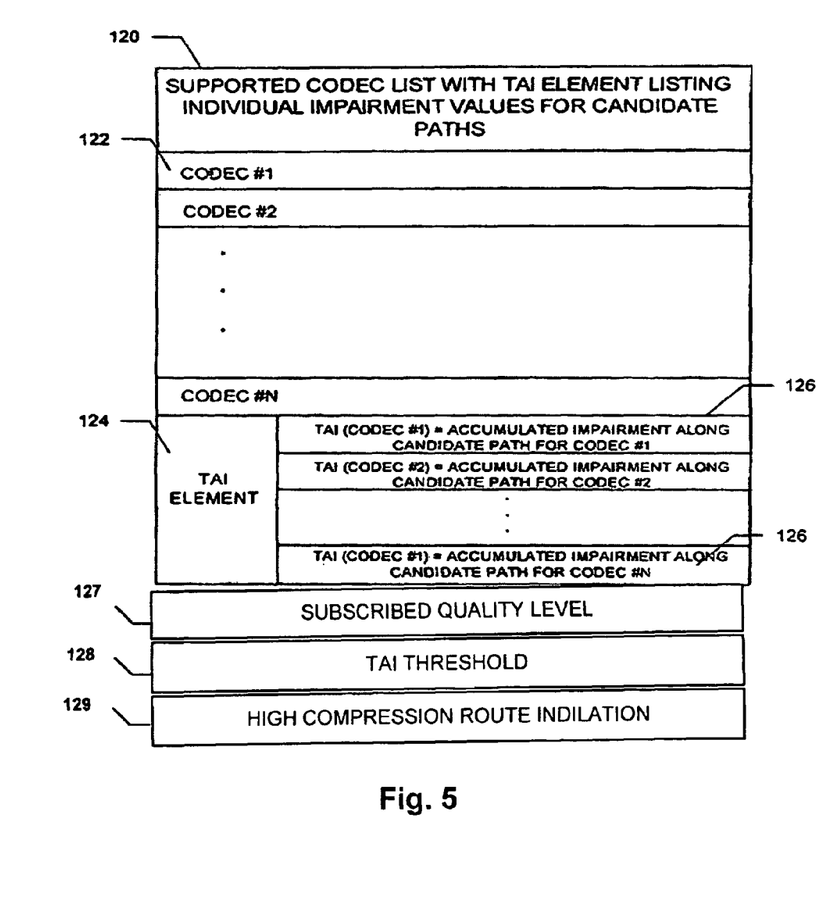
FIG. 5 is a block diagram illustrating an exemplary information element of FIG. 4.

Turning now to FIGS. 4 and 5, an information element 120 is contained within message 123 and relayed between MSC server 102 and MSC server 104, wherein the information element 120 includes a supported codec list 122, a subscribed quality level indication 127 indicating a target quality level for the originating subscriber, as well as a total accumulated impairment (TAI) data element 124 listing individual impairment values 126 associated with candidate paths leading up to, and including, the supported codecs 122. Furthermore the information element 120 includes a TAI threshold 128 indicating a maximum allowed impairment and a high compression route indicator 129 indicating whether a required bandwidth should be minimized for at least one of the connection stages of the connection. The TAI threshold 128 may be defined by the operator of the communication network 100 or determined according to a subscription. Regarding the (TAI) data element 124 for each particular supported codec (or other element that may affect the connection quality) of a given stage, an individual TAI value is stored within the TAI element that represents the total expected impairment associated with the candidate path leading up to, and including, that particular codec of that particular stage. Hence, the TAI element includes the accumulated impairments for each of the listed supported codecs. That is, the TAI element is associated with a list of supported coding schemes, not with a list of particular transcoder devices. For the example of FIG. 2, message 123 sent from the originating stage to the intermediate stage thereby includes a list of the five codecs supported by the originating stage, as well as an indicator value for each of the five codecs supported by the originating stage. Each indicator value represents the expected accumulated impairment along the candidate path that leads up to, and includes, the corresponding supported codec. After the message is received by the intermediate stage, the intermediate stage will then change the indicator values to reflect the codecs supported by the intermediate stage. Preferably, the indicator 124 is sent only between control nodes (102-106) whereas the connection itself 113 is established between the payload nodes (108-112). Advantageously the subscribed target quality level 127 corresponds to a range of allowed TAI values. Thus the supported codec list could be preselected by removing those codecs of the supported codec list that are associated with a corresponding TAI value outside the range of allowed TAI values corresponding to the subscribed quality level. In addition, according to one particular embodiment of the invention, a control node (102-106) advantageously adds one ore more codecs having an associated TAI value within the range of allowed TAI values to the supported codec list, if needed.

Returning to the example of FIG. 1, the subscribed target quality level 127 of the originating subscriber is first determined in the originating MSC 102. To that end the MSC 102 may access a subscriber data record of the originating subscriber that is stored in the VLR 103 and that has been previously downloaded from the HLR 105 of the originating subscriber. In addition, the MSC 102 may access the subscriber data record of the originating subscriber to determine a TAI threshold value that indicates the maximum allowed connection impairment for the originating subscriber. Alternatively the MSC 102 may perform an IMSI number series analysis to map the IMSI of the originating subscriber to a subscribed target quality level. Furthermore the TAI element of message 123 is first generated by the MSC 102 of the originating stage 115 based on the codecs that it supports and all knowledge it may have of the path 301 from the originating terminal up to MGW 108. The subscribed target quality level 127 and preferably the TAI threshold 128 are then sent to the MSC 104 of the intermediate stage along with the TAI element. The MSC 104 of the intermediate stage then memorizes the received TAI values and updates the TAI values based on the codecs its MGW 110 supports. Individual impairment values may be left unaltered or may be increased due to additional expected impairment. The originating MSC 102 checks, whether the connection stage 302 between originating MGW 108 and intermediate MGW 110 is indicated as a 'high compression route', i.e. as a connection portion, on that the requirement to minimize transmission bandwidth has a precedence over the requirement that the connection to be set up complies with a subscribed target quality level. By configuring particular connection portions in his communication network 100 to be 'high compression routes', the operator of the communication network 100 can force a improved utilization of the bandwidth resource of that particular connection portion. This is particular advantageous, if bandwidth is scarce e.g. if the connection portion comprises a satellite link. If the result of check is to the affirmative, a high compression route indication 127 indicating that the connection to be set up comprises at least a portion for that the transmission bandwidth should be minimized is included into the message 123.

The subscribed quality level indication 127 of the originating subscriber, the TAI element 124, and preferably the TAI threshold value and the high compression route indication 129 are then sent to the MSC 106 of the terminating stage 119, which further updates the TAI values based on the codecs its MGW 112 supports and all knowledge it may have of the path 304 from MGW 112 up to the terminating terminal. In addition to the subscribed quality level of the originating subscriber the MSC 106 advantageously determines a subscribed quality level of the subscriber using the terminating user equipment, herein termed the terminating subscriber. To that end similar methods may be used than the methods used in connection with the subscribed quality level of the originating subscriber described above. I.e. the MSC 106 may access a subscriber data record stored in the VLR 107, which subscriber data record has been previously downloaded from the HLR 109 of the terminating subscriber. Alternatively the MSC 106 may perform an IMSI number series analysis to map the IMSI of the terminating subscriber to a subscribed target quality level. Based on the information within the TAI element and at least one of the subscribed target quality level of the originating subscriber and the subscribed target quality level of the terminating subscriber, the terminating MSC 106 selects a combination of codecs for use in the path-segments 303 and 304 that will result in an impairment to the overall connection within the impairment value range that corresponds to the subscribed quality level of the originating subscriber or of the terminating subscriber. In that regard, the operator may provide a service definition defining whether to consider the subscribed quality level of the originating subscriber or of the terminating subscriber to select the codec combination. As an alternative, however the selection of the codecs may be influenced by both, the subscribed quality level of the originating subscriber and of the terminating subscriber as will be exemplified by exemplary embodiments as described below. In the context of the below described exemplary embodiments, the subscribed quality levels 'low', 'medium', and 'high' are used for illustrative purposes and shall not be understood as limiting.

According to a first embodiment originating MSC 102 composes a supported codec list without considering the subscribed quality level of the originating subscriber at that point. Even if the subscribed connection quality level of the originating subscriber would be 'low quality' also codecs associated with a total accumulated impairment corresponding to a 'medium' or a 'high' connection quality associated with the originating subscription are included in the supported codec list. An indication of the subscribed target quality level of the originating subscriber is included in message '123' as described above. The terminating MSC 106 checks the received indication of the subscribed quality level and determines the associated range of allowed impairment values for the connection. The MSC 106 then selects a codec, such that the expected impairment value for the connection is within the determined range of allowed impairment values. In this embodiment the terminating MSC 106 has a freedom to select the codec to be employed which is not limited by a preselection reflected in the supported codec list. Thus the situation may be avoided, that a call connection has to fall back to PCM due to a lack of selectable supported codecs.

According to a further embodiment the originating MSC 102 checks the subscribed quality level of the originating subscriber prior to composing the supported codec list. In that regard the originating MSC 102 only considers those codecs that are associated with an expected connection quality having an impairment value within the range of allowed impairment values associated with the subscribed quality level of the originating subscriber. I.e. for a subscriber having a 'low' connection quality subscription, a supported codec list which is limited in accordance with that low quality is composed. When the terminating MSC 106 selects a codec to be employed, the selection is limited to the codecs within the preselected supported codec list. By this, the connection quality level can be controlled, even if the indication of the subscribed quality level is not transmitted in message 123 or if the terminating MSC 106 is not adapted to recognise an indication of the subscribed quality level received in message 123. According to another embodiment both the subscribed target quality level of the originating subscriber and the subscribed target quality level of the terminating subscriber are considered in the codec selection process. To that end the originating MSC 102 considers the subscribed quality level of the originating subscriber to compose a list of supported codecs having an expected impairment equal or above the range that corresponds to the subscription of the originating subscriber. In its subsequent selection of a codec to be employed, the terminating MSC 106 composes a similar internal list of codecs having an expected impairment equal or above the range that corresponds to the subscription of the terminating subscriber. The terminating MSC 106 than merges the supported codec list and the internal list to obtain a merged list of codecs comprised in both the supported codec list and the internal list and selects the codec to be employed for the connection within the merged list.

In a similar way the supported codec list could compose a list of supported codecs having an expected impairment equal or below the range that corresponds to the subscription of the originating subscriber and the terminating MSC 106 could compose an internal list of codecs having an expected impairment equal or below the range that corresponds to the subscription of the terminating subscriber.

According to a yet a further embodiment different connection quality levels are provided for the originating and the terminating subscriber. The terminating MSC 107 then checks the subscribed quality level of the originating subscriber received in message 123 and selects a codec for the transmission towards the originating subscriber accordingly. The terminating MSC 107 also checks the subscribed quality level of the terminating subscriber as described above to select a codec for the transmission towards the terminating subscriber. The originating user equipment and the terminating user equipment advantageously employ different configurations of the same multi-rate speech codec type. Different speech quality levels for transmission from the originating user equipment towards the terminating user equipment and from the terminating user equipment towards the originating user equipment can be achieved through rate control. The control nodes 102-106 then trigger the MGWs 114-118 to use different rate control commands in the different transmission directions.

According to yet another embodiment different subscriber classes are defined, which define which of the above described methods shall be applied to select a codec, if the originating and the terminating subscriber have subscribed to different target quality levels. An indication of a subscriber class for a particular subscriber is then also included in a subscriber data record.

Note that MSC 106 must select the codec for path 303 from the list of codecs in the Supported Codec List it received from MSC 104. MSC 106 must select a codec from the list it received from the terminating terminal for path 304. Ideally, these codecs for paths 303 and 304 are identical and no transcoding is necessary. MSC 106 then relays the Selected Codec and the Alternative Codec List and the associated TAI elements back through MSCs 104, 102 of the various stages so that they can check the previously memorized codec combinations of the candidate path to then select and activate the codecs for use in their path-segments 302 and 301. Thus, according to this embodiment the codec selected for the final connection stage determines the selected candidate connection path and by this the selection of the codecs at the intermediate connection stages.

As an alternative, however, end-to-end impairment calculations can be performed also at an intermediate or an originating connection stage to determine a codec to be selected for the intermediate or the originating connection stage. Reference is made to FIG. 4, showing the originating MSC server 102, the intermediate MSC 104 as well as the terminating MSC 106. Message 123 comprising information element 120 is transmitted from originating MSC server 102 to intermediate MSC server 104 at call set up in call forward direction.

With information element 120 the selectable supported codecs and the associated TAI values are received at intermediate MSC 104 and memorized therein. Later at call set up message 133 is transmitted in call backward direction from the terminating MSC server 106 to the intermediate MSC server 104 comprising information element 130 which is formatted similarly as information element 120 described above.

Information element 130 comprises a list of codecs available at the succeeding connection stage including a selected codec for the succeeding connection stage, as well as TAI values associated with the available codecs including a TAI value associated with the selected codec for the succeeding connection stage. Intermediate MSC server 104 then considers the previously received and memorized TAI values for codec candidates selectable at a particular connection stage controlled by the MSC server 104 and combines those TAI values with the received TAI value of the selected codec for the succeeding connection stage to calculate end-to-end TAI values potentially resulting from selecting a codec candidate for the particular connection stage. A codec candidate having a calculated end-to-end TAI value within an allowable range of TAI values, or at least conforming to the maximum allowed TAI threshold may then be selected. According to a preferred embodiment a high compression route indication is comprised within TAI element 130 indicating whether at least one of the connection stages requires minimizing the transmission bandwidth dedicated to the connection. The TAI element 130 is checked, and if an indication to use a high compression route is present, a determination is made that the requirement to minimize transmission bandwidth has a precedence over the requirement that the connection to be set up complies with a subscribed target quality level. Then, the potentially less strict maximum allowed TAI threshold is applied. The codec selected at the particular connection stage may then be sent in backward direction together with a calculated associated TAI value to allow a similar TAI value calculation and codec selection at the next transmission stage in backward direction.

Note that the information contained within data element 124 is not limited to providing an identification of the accumulated impairment due to the operation of a sequence of codecs along a candidate pathway, but can additionally (or in the alternative) reflect impairment due to radio impairment arising in connection with the candidate pathway as well, or acoustic impairments, or impairments due to digital signal processing, such as noise reduction, echo cancellation, level compensation, and the like. In the case of signal quality improving processing techniques such as noise reduction, echo cancellation and level cancellation the accumulated impairment may also decrease.

Preferably, the new TAI element 124, the subscribed quality level indication 127, the TAI threshold 128, and the high compression route indication 129 are inserted within the (existing) list of supported codecs of the message as if it were merely another supported codec within the list. Accordingly, any MSC that has not been configured to recognize and exploit the TAI element, or another newly introduced indication will simply delete the TAI element or the other indication as if it were merely an unsupported codec. Those MSCs that are configured to recognize and exploit the TAI element, the subscribed quality level indication 127, the TAI threshold 128 or the high compression route indication 129 will extract data from the element for use in updating the TAI element and/or determining the sequence of codecs to be employed, i.e. to determine which codecs should be activated or deactivated from that portion of the connection that the particular MSC controls. In this manner, the TAI element, the subscribed quality level indication, the TAI threshold and the high compression route indication are backward-compatible, i.e. it is compatible with any pre-existing network components that are not specifically configured to recognize and exploit the TAI element, the subscribed quality level indication, the TAI threshold or the high compression route indication. Note that MSCs configured to recognize and exploit the TAI element can select a codec either via "external" selection or "internal" selection. By external selection, it is meant that the MSC merely selects a codec from the list of supported codecs for the incoming link. With internal selection, the MSC selects an additional, potentially different codec based on its own capability for generating a new TAI list with updated TAI values, which is subsequently forwarded to other MSCs on the outgoing link.

Figure 6:
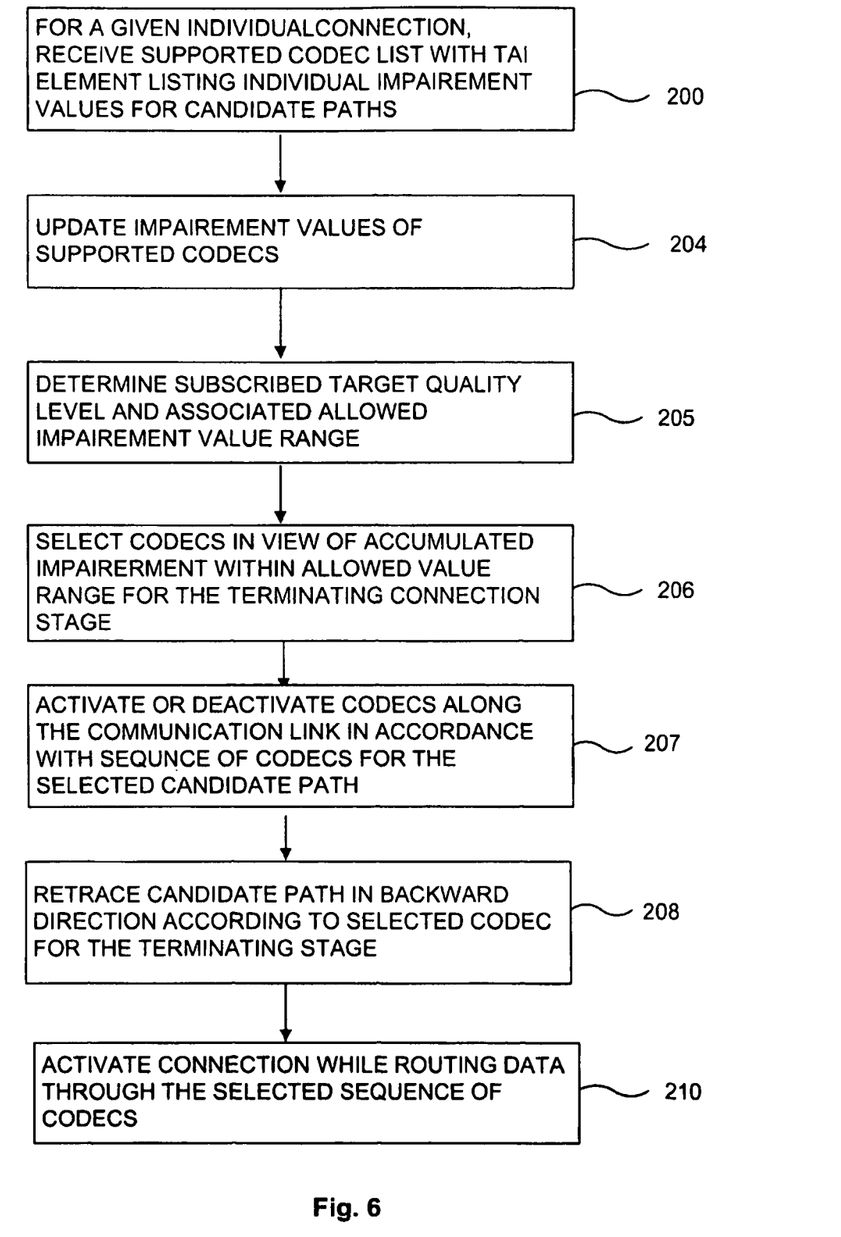
FIG. 6 is a flowchart diagram depicting a codec selection procedure in accordance with the teachings of the present invention

FIG. 6 summarizes the use of the TAI element in connection with specific attention to the terminating MSC. Briefly, beginning at step 200, for a given individual connection, such as a particular mobile call, the terminating MSC receives a supported codec list that preferably incorporates the subscribed quality level of the subscriber that has originated the call. The supported codec list further incorporates the TAI element listing the individual impairment values for the candidate paths, represented by these codec candidates. At a first step, any unsupported codecs are then removed from the list (state of the art, not shown). That is, any codes associated with codecs that are not supported by the particular portion of the connection that the terminating MSC controls are moved from the list. This is in accordance with otherwise conventional techniques. Together with the unsupported codec candidates, also their TAI values are eliminated. At step 204, the individual impairment values are updated to reflect additional impairments due to the codecs of the terminating stage (terminating MGW) and the terminating path to the terminal and are then analyzed to determine the sequence of codecs from among the list of remaining supported codecs. Note: the terminating MSC has the power to select the codec for its incoming link and it can offer one or more codecs for the outgoing link. At step 205 the terminating MSC checks the subscribed quality level, either associated with the originating subscriber and previously received with the supported codec list or associated with the terminating subscriber. The subscribed quality level of the terminating subscriber may be determined by IMSI number analysis or fetched from the subscriber record of the terminating subscriber, as explained above. Then the terminating MSC determines the associated impairment value range, i.e. the range of allowed impairment values that corresponds to the checked subscribed quality level.

Subsequently, at step 206 the terminating MSC selects the codecs for its incoming and its outgoing connection stage so that the overall accumulated impairment for the connection lies within the determined allowed impairment value range.

At step 207, the terminating MSC activates or deactivates these two codecs from the communication link in accordance with the optimal sequence of codecs determined for that particular connection. In this regard, the terminating MSC sends appropriate control signals to one or more associated MGWs so as to control the MGWs to route the connection through the codecs that the terminating MSC has determined are optimal for that particular portion of the connection.

At step 208, the MSC of the terminating stage relays the TAI element and the codec selected for the incoming connection stage of the terminating MSC to the MSCs of the preceding stages to enable those MSCs to retrace the candidate connection path corresponding to this selected codec and to allow those MSCs to also select their codecs and to also instruct the MGWs associated with these MSCs to activate or deactivate the selected codecs in accordance with the selected candidate connection path.

Finally, at step 210, the originating MSC activates the connection. Data for the connection, such as encoded speech data, is routed through the selected sequence of codecs. Note that the example of FIG. 10 is a simplified example providing an overview of just the operation of the MSCs, focusing on the terminating stage. In practice, the MSCs of each stage access and potentially modify each TAI element.

Preferably, the TAI indicator of the invention is also implemented in connection with TFO (see 3GPP TS 28.062) and TrFO (see 3GPP TS 23.153), which are technologies in 3GPP that aim to avoid speech quality impairments caused by unnecessary transcoding steps along the speech path. Both technologies exchange lists of codec-type candidates to allow the decision to be made as which codec type to use on which sub-link of the speech path. Further information may be found in 3GPP TR 23.977 (BARS). The "Codec Negotiation" can either be realized by "Inband Signaling" (for TFO, see TS 28.062), or by OoBTC (see 3GPP TS 23.153), or by the "SIP" (see SIP: (Internet Engineering Task Force) IETF standard) together with "SDP" (see also the IETF standard) and by a 3GPP variant of SIP, called IMS ("IP Multimedia Sub-System"). However, principles of the invention may potentially be exploited in connection with other technologies as well. For the sake of simplicity, examples of the TAI element are primarily provided herein for use with OoBTC.

The values inserted within the TAI may be initially derived using the E-Model of ITU-T. In particular, the E-Model (see G.107 and G.108) and other sources (see 3GPP TR 26.975) specify or allow to derive the intrinsic TAI values (impairment elements, also called "IE-Values" in the E-Model). "Intrinsic" means: "without any transmission errors". The "Impairment elements" (Ie) defined in the standard E-Model may also be modified in some cases to give the overall decision a certain "drift". At call setup, the originating call control node (e.g. the MSC-Server in the BICN in a mobile originating call) generates a list of Codec Types (i.e. a Supported Codec List) that are offered as alternatives for this call, see TS 23.153. This is otherwise conventional. In addition, though, the new TAI IE (IE=Information Element) is added as a "dummy Codec Type" entry in the Supported Codec List. This TAI IE holds new integer parameters (referred to herein as tai1, tai2, . . . ), with one for each entry of Codec Type IEs in the Supported Codec List. Furthermore, in accordance with the teachings of the present invention, a "subscription quality level" is included in the "dummy Codec Type" entry in the Supported Codec List as a new parameter. In one example this new parameter comprises one of the values 0 (=no subscription, 1 (=high quality subscription,) 2 (=medium quality subscription), and 3 (=low quality subscription)).

Figure 7:
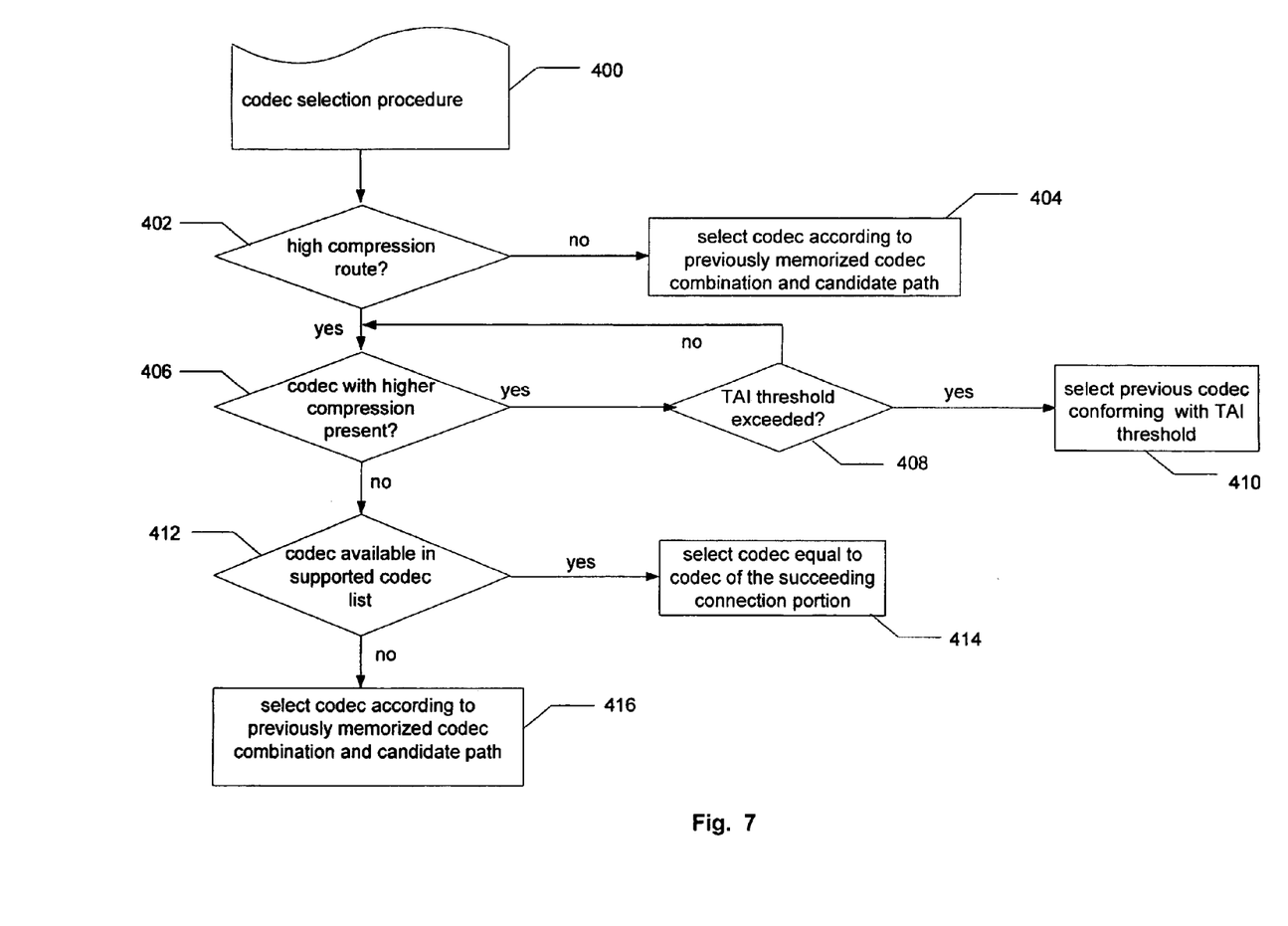
FIG. 7 is a flowchart diagram depicting an aspect of a codec selection procedure in accordance with the teachings of the present invention

Reference is now made to FIG. 7, depicting a flow chart of a codec selection procedure 400 in accordance with the teachings of the present invention. The depicted codec selection procedure 400 can be employed by a controlling node such as the intermediate MSC server 104 using information like the information received in information element 130 and information element 120. More precisely, the depicted codec selection procedure is dedicated to selecting a codec for a current connection portion, based on a selected codec of a succeeding connection portion, a list of codecs available at the present connection portion, a list of corresponding TAI values for succeeding connection portions, associated with employing the codecs of the available codec list at the succeeding connection portion, and a TAI threshold indicating a maximum allowed impairment of the connection to be established. The selected codec, the TAI values associated with the available codecs, and the TAI threshold are all advantageously received with information element 130 in a format similar to the format of information element 120 depicted an FIG. 5.

Furthermore the codec selection procedure 400 is based on a list of supported codecs supported for the previous connection portion and associated TAI values for preceding connection portions, TAI values describing the total accumulated impairment of a candidate connection path associated with employing a codec of the supported codec list at the current connection portion. The list of supported codecs and the associated TAI values are both advantageously received with the information element 120 and memorized in the controlling node in response to the receiving step. The controlling node has access to a high compression route indicator, that has been advantageously received with information element 130 and that indicates whether or not the connection to be set up comprises any connection stage that requires an optimized bandwidth utilization, i.e. that bandwidth utilization has to take precedence over a subscribed connection quality. This checking is done at step 402. If the answer is no and no high compression route indication is present, processing step 404 is performed and a codec of the candidate path is selected, that has been previously memorized as being associated with the selected codec of the succeeding connection stage. If the result of the check at step 402 is yes, a codec providing a higher compression than the memorized codec associated with the selected codec is aimed to be selected. To that end the codecs available for the current connection portion are checked as to whether a codec providing a higher compression is present among those available codecs at step 406. If the result of the check is yes and codecs with a higher compression are present, the codec with the next higher compression is preselected and checked at step 408 as to whether applying the preselected codec could potentially exceed the TAI threshold. To this end an expected end to end impairment is calculated based on combining the TAI value received for the selected codec of the succeeding connection stage with the TAI value received for the preselected codec. The calculated end to end impairment is subsequently compared with the TAI threshold value to determine whether employing the preselected codec potentially exceeds the TAI threshold. If the result is no, the procedure continues with applying step 406 again and preselecting a codec with the next higher compression. This procedure continues until the a preselected codec exceeds the TAI threshold. Then, at step 410 the previous codec, i.e. the last codec conforming with the TAI threshold is selected as the codec to be applied for the current connection portion. This is the codec with the highest compression still conforming with the TAI threshold.

If the result of the checking step 406 is negative and no codec providing a higher compression then the previously memorized codec can be found within the list of available codecs, the procedure continues with checking step 412, checking whether the codec selected for the succeeding connection portion is available in the received supported codec list. If the answer is yes, the codec selected at the succeeding connection stage is also selected for the current connection stage at step 414. If the result of the checking step 412 is negative, processing step 416 is performed and a codec is selected, that has been previously memorized as being associated with the selected codec of the succeeding connection stage and its respective candidate path.

The invention claimed is:

1. A method for controlling the establishment or modification of a connection in a communication network, wherein the connection is to be established or modified between nodes that are adapted to employ a coding scheme selected from a plurality of supported coding schemes having a different demand on a transmission bandwidth dedicated to the connection to be established or modified, the method comprising:
   determining an expected demand on the transmission bandwidth associated with employing at least one of the supported coding schemes, wherein the supported coding schemes potentially affect a connection quality;
   determining an allowed impairment value threshold, according to a subscription of a subscriber and indicating a maximum allowed impairment of the connection to be established or modified;
   an expected accumulated impairment value indicating an expected accumulated impairment associated with employing a corresponding coding scheme for the connection being determined for at least one of the supported coding schemes, wherein a network node controlling the connection selects the coding scheme to be employed within one or more coding schemes having an associated accumulated impairment value conforming with the allowed impairment value threshold;
   determining a quality level subscribed to by said subscriber associated with the connection to be established or modified,
   checking whether the connection comprises a connection stage, wherein a requirement to minimize transmission bandwidth has precedence over the subscribed quality level,
   sending an indicator indicating that the expected transmission bandwidth should be minimized for the connection,
   receiving the indicator in the network node controlling the connection, wherein the network node controlling the connection
   checks the indicator,
   determines to minimize the transmission bandwidth, and
   selects the coding scheme to be employed such that the associated expected transmission bandwidth is minimized.

2. The method according to claim 1, the connection comprising a plurality of connection stages wherein a plurality of candidate paths, with respect to concatenations of coding schemes, leads from one or more preceding stages through a current stage to succeeding stages, and regarding a particular one of the plurality of candidate paths the node controlling the connection receives a first impairment value indication indicating an expected impairment associated with employing any coding schemes of the one or more preceding stages of the particular candidate paths, the node controlling the connection receives a further impairment value indication indicating an expected impairment associated with employing any coding scheme of the succeeding stages of the particular candidate path, wherein the node controlling the connection uses the first and the further impairment value indication when it determines the accumulated impairment of the candidate path associated with employing coding scheme at its current stage.

3. In a communications network, a program unit stored on one or more network nodes, for instructing the one or more network nodes to perform the following steps when the program unit is run on the network nodes:
   controlling the establishment or modification of a connection in a communication network, wherein the connection is to be established or modified between nodes that are adapted to employ a coding scheme selected from a plurality of supported coding schemes having a different demand on a transmission bandwidth dedicated to the connection to be established or modified,
   determining an expected demand on the transmission bandwidth associated with employing the at least one of the supported coding schemes wherein the supported coding schemes potentially affect a connection quality;
   determining an allowed impairment value threshold, according to a subscription of a subscriber and indicating a maximum allowed impairment of the connection to be established or modified;
   an expected accumulated impairment value indicating an expected accumulated impairment associated with employing a corresponding coding scheme for the connection being determined for at least one of the supported coding schemes, wherein a network node controlling the connection selects the coding scheme to be employed within one or more coding schemes having an associated accumulated impairment value conforming with the allowed impairment value threshold;
   determining a quality level subscribed to by said a subscriber associated with the connection to be established or modified,
   checking, whether the connection comprises a connection stage, a requirement to minimize transmission bandwidth having precedence over the subscribed quality level,
   sending an indicator indicating that the expected transmission bandwidth should be minimized for the connection
   receiving the indicator in the network node controlling the connection,
   checking the indicator,
   determining to minimize the transmission bandwidth, and
   selecting the coding scheme to be employed such that the associated expected demand on network resource utilization is minimized.

* * * * *